Nov. 25, 1958 M. J. RELIS 2,862,046

STABILIZED DIRECT-COUPLED AMPLIFIER

Filed Jan. 28, 1955 2 Sheets-Sheet 1

INVENTOR.
MATTHEW J. RELIS
BY Everett M Fraser
ATTORNEY

Nov. 25, 1958 M. J. RELIS 2,862,046

STABILIZED DIRECT-COUPLED AMPLIFIER

Filed Jan. 28, 1955 2 Sheets-Sheet 2

INVENTOR.
MATTHEW J. RELIS
BY Everett M Fraser
ATTORNEY

United States Patent Office 2,862,046

Patented Nov. 25, 1958

2,862,046

STABILIZED DIRECT-COUPLED AMPLIFIER

Matthew J. Relis, Bayside, N. Y., assignor to Burroughs Corporation, Detroit, Mich., a corporation of Michigan Application January 28, 1955, Serial No. 484,622

4 Claims. (Cl. 179—171)

Figure 1:
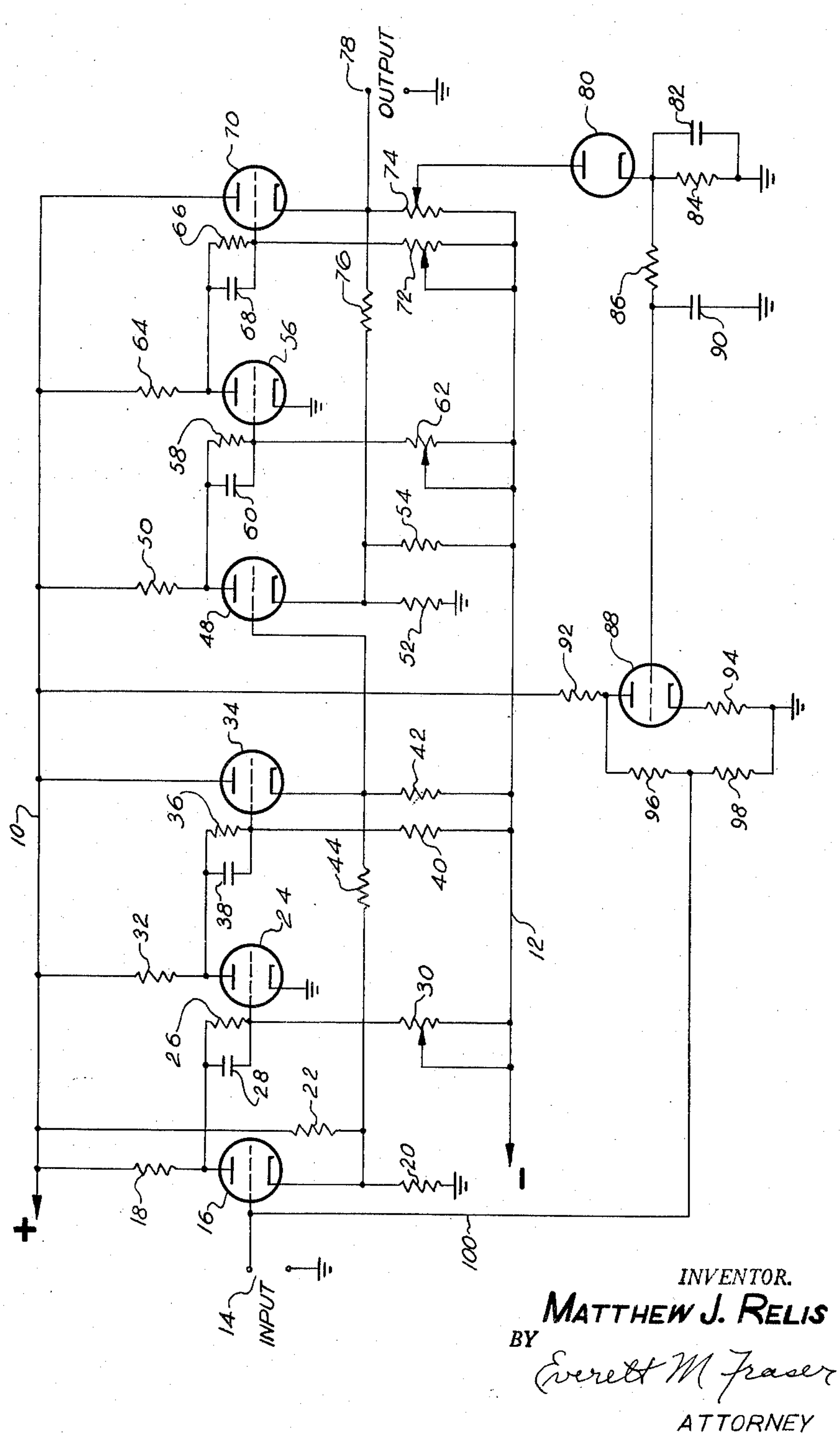

This invention relates to direct-coupled amplifiers and more particularly it relates to direct-coupled amplifiers stabilized to minimize drift in applications where the input signal is characterized by a repetitive excursion extremity.

In certain electrical systems a signal is used which has repetitive pulses which correspond to an excursion extremity of the waveform, the voltages of the successive excursion extremities being the same. The excursion extremity may be either the most positive-going or the most negative-going portion of the entire waveform. When such a signal is amplified it is often desirable that the voltages of the excursion extremities of the waveform at the output of the amplifier be the same each time the waveform appears.

Where the signals to be amplified are low-level video signals, the use of carrier amplifiers is not practical because of modulation difficulties. In A. C. amplifiers, if the duty cycle of a video signal varies considerably from one excursion extremity to the next, various types of time domain distortion are introduced which tend to limit the faithfulness with which the input waveform can be reproduced.

The direct-coupled amplifier can be made to have excellent phase and amplitude characteristics. However, it is very sensitive to fluctuations of the voltage supplying it, and the difficulties caused by the resultant drift has precluded its use in many applications. A direct-coupled amplifier is an amplifying circuit having one or more amplifying transducers conductively connected in cascade between the input and output terminals of the circuit.

It is known that the output of a direct-coupled video amplifier can be stabilized by a direct-current restorer followed by a cathode follower from which the video output is derived. However, in applications where the gain of the direct-coupled amplifier is high, drift within the amplifier may cause the bias on one or more of the stages to go beyond the proper operating range. This difficulty is mainimized in the subject invention by accomplishing the stabilization in the direct-coupled amplifier itself, instead of at the amplifier output.

It is an object of this invention to provide a direct-coupled amplifier having minimal drift characteristics in applications where the input signal is of the type characterized by a repetitive excursion extremity.

In accordance with the method of the invention the direct-coupled amplifier is stabilized by the application of a portion of the output voltage to a peak detector circuit. The peak detector resistance-capacitance circuit has a discharge time which is long compared to the time intervals between the repetitive excursion extremities. The peak detector rectifies a voltage equal to the applied portion of the voltage at each excursion extremity. The voltage across the resistance-capacitance circuit is thus maintained at the approximate level of the maximum voltage applied to the peak detector circuit at each repetitive excursion extremity. The resistance-capacitance circuit constitutes a potential storage circuit from which a bias for the input tube of the amplifier is obtained which changes with, and counteracts, the shifts in the direct-current output level of the amplifier. In this manner a direct-coupled amplifier to which signals are applied which have repetitive excursion extremities can be stabilized against variations caused by drift in the amplifier and also against variations caused by shifts in the direct-current level at the input to the amplifier.

Other objects of the invention will be pointed out in the following description and claims and illustrated in the accompanying drawings which illustrate, by way of example, the principle of the invention and the best modes which have been contemplated of applying that principle.

Figure 2:
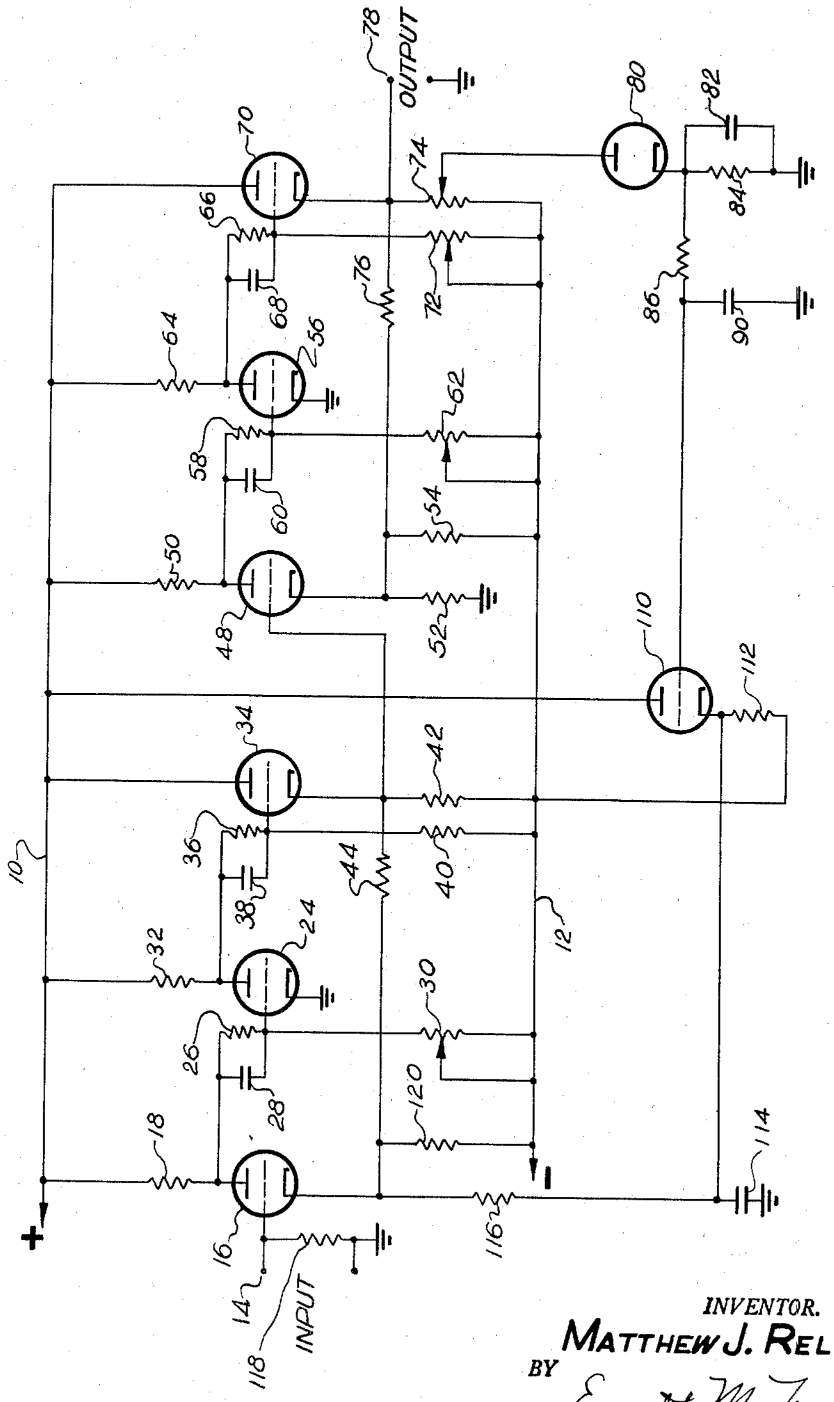

In the drawings:

Fig. 1 is a circuit diagram of a direct-coupled amplifier which embodies the principle of the invention; and Fig. 2 is a circuit diagram of a second embodiment of the invention.

The direct-coupled amplifier illustrated in Fig. 1 is of the type which has a positive supply line 10 at a potential above that of ground, and a negative supply line 12 at a potential below that of ground.

The amplifier has two triplet sections, each section having two voltage amplifying tubes and a cathode follower tube. The amplifier input 14 is connected to the grid of the first voltage amplifying triode tube 16. Tube 16 has its anode connected through a resistor 18 to the positive power supply line 10 and has its cathode connected through a resistor 20 to ground potential and through a comparatively large resistor 22 to the positive supply line 10, so as to obtain the proper bias potential on the cathode.

The output of tube 16 is obtained from the anode and is connected through a resistor 26 and a parallel condenser 28 to the grid of the second voltage amplifying triode tube 24. The grid of tube 24 is connected through the variable resistor 30 to the negative supply line 12 and the cathode is connected to ground potential. The anode is connected through resistor 32 to the positive supply line 10 and is connected to the grid of the cathode follower tube 34 through a resistor 36 and a condenser 38 connected in parallel with resistor 36. The grid and the cathode of tube 34 are connected separately through the respective resistors 40 and 42 to the negative supply line 12. The anode is directly connected to the positive supply line 10.

The first section of the amplifier, which includes tubes 16, 24 and 34, is gain-stabilized by a negative feed-back connection from the cathode of the cathode follower tube 34 through a resistor 44 to the cathode of the first voltage amplifying tube 16.

The output of the first section of the amplifier is taken from the cathode of tube 34 and is connected to the grid of the first voltage amplifying triode tube 48 of the second section of the amplifier. The anode of tube 48 is connected through a resistor 50 to the positive supply line 10 and the cathode is connected to ground through resistor 52. To hold down the cathode potential the cathode of tube 48 is also connected to the negative supply line 12 through the comparatively large resistor 54.

The output of tube 48 is taken from its anode and is connected to the grid of the voltage amplifying triode tube 56 through a resistor 58 and through a parallel connected condenser 60. The grid of tube 56 is connected to the negative power supply line 12 through a variable resistor 62. The anode of tube 56 is connected through resistor 64 to the positive power supply line 10 and the cathode is connected to ground potential.

The output of tube 64 is taken from the anode and is connected through a resistor 66 and through a parallel condenser 68 to the grid of the final cathode follower tube 70. The grid of tube 70 is connected to the negative power supply line 12 through a variable resistor 72, the plate is connected directly to the positive power supply line 10 and the cathode is connected to the negative supply line 12 through the resistance of a potentiometer 74.

The second section of the direct coupled amplifier, like the first section, is gain-stabilized by a feedback connection from the cathode of the cathode follower tube 70 through a resistor 76 to the cathode of the first voltage amplifying tube 48 of the second section. The circuit output 78 is also taken from the cathode of tube 70.

The two triplet sections of the direct-coupled amplifier are drift-stabilized by a feedback path between the potentiometer 74 and the input circuit of the first voltage amplifying tube 16. The potentiometer 74 has an adjustable contact arm which is connected to the anode of a diode detector tube 80. The cathode of tube 80 is connected to ground potential through a condenser 82 and a resistor 84 connected in parallel with the condenser. The resistor and condenser constitute a potential storage circuit with a discharge time constant which is large with respect to the time intervals between the successive signal excursion extremities.

When a positive signal excursion extremity is applied to the input of the direct-coupled amplifier, a similar signal of greater amplitude appears across the resistance of the potentiometer 74 at the output end of the amplifier. A portion of the output voltage is applied across the resistance-capacitance circuit 82 and 84 through the anode-cathode path of the diode detector 80 whenever the potential at the adjustable contact arm of the potentiometer 74 rises above the potential at the cathode of the tube 80. As the potential drops at the contact arm of potentiometer 74 the anode of the tube 80 becomes negative with respect to the cathode and the tube stops conducting. The potential at the cathode of the diode, therefore, remains substantially equal to the successive potentials applied to the contact arm of the potentiometer 74 at the repetitive signal excursion extremities.

The cathode of the diode 80 is connected through a resistor 86 to the grid of a triode tube 88. The resistor 86 and a condenser 90, connected between the grid of tube 88 and ground potential, together constitute a filter to impair the high frequency response of the feedback path so as to eliminate sustained oscillations which might otherwise occur.

The anode of triode 88 is connected to the positive power supply through a resistor 92 and the cathode is connected to ground potential through a resistor 94. Voltage dividing resistors 96 and 98 are connected serially between the anode of tube 86 and ground potential. The output of tube 88 is taken from between the resistors 96 and 98 and is connected through a line 100 to the grid of the input tube 16.

The triode tube 88 serves to invert the phase of the slowly varying voltage applied from the potential storage circuit 82, 84. The grid of the input tube 16 has a bias which is varied by changes in the voltage across resistor 98. The voltage across resistor 98 is varied in an opposite direction by changes in the voltage stored across condenser 82 which, in turn, is varied by changes in the voltage attained by each successive signal excursion extremity.

It is apparent, therefore, that as the voltage of the successive signal extremes at the circuit output 78 tends to drift up or down, the bias on the grid of the first voltage amplifying tube 16 varies down or up, in a direction tending to counteract the drift.

The arrangement shown in Fig. 1 for biasing tube 16 is suitable for a high impedance source of signals such as a photocell, wherein the anode of the photocell is connected to the circuit input 14 and to ground potential through the resistor 98 which, therefore, also serves substantially as the photocell anode load resistor. This arrangement is shown by way of example and may be modified or changed in ways well known to the art to accommodate signal sources of different kinds and impedances.

A second embodiment of the invention is shown in Fig. 2. With the exception of the grid and cathode connections of the input tube, the two triplet sections of the direct-coupled amplifier shown in Fig. 2 have the same components with the same interconnections as do the two triplet sections of the circuit shown in Fig. 1. The components of the triplet stages common to the circuits of Figs. 1 and 2 are designated by the same reference numbers.

The circuit of Fig. 2 also employs the same peak detector diode 80, with its anode connected to the adjustable contact arm of the potentiometer 74, and its cathode connected to ground through the potential storage circuit consisting of the resistor 84 and the parallel condenser 82.

The cathode of diode 80 is connected through a resistor 86 to the grid of a triode tube 110. As in the circuit of Fig. 1 the resistor 86 and a condenser 90, connected between the grid of tube 110 and ground potential, constitute a filter to impair the high frequence response of the feedback path.

The triode tube 110 is utilized in the circuit of Fig. 2 as a cathode follower tube. The anode of tube 110 is connected directly to the positive supply line 10 and the cathode is connected through resistor 112 to the negative supply line 12. The cathode of tube 110 is connected through a resistance 116 to the cathode of the first voltage amplifying tube 16. A small condenser 114 is connected between the cathode of tube 110 and ground potential to eliminate parasitic oscillations. The grid of the input tube 16 is biased to ground by a resistor 118 and the cathode is additionally biased to the negative supply line 12 through a resistor 120.

The cathode follower tube 110 in this circuit provides a high impedance pickoff from the potential storage circuit and a low impedance feedback source to regulate the potential of the cathode of tube 16. As the potentials attained by successive signal excursion extremities at the amplifier output 78 drift up or down, the potential of the cathode of the input tube 16 is varied in a corresponding direction, thus changing the grid bias to counteract the drift at the amplifier output.

It can be seen that the circuits of Figs. 1 and 2 introduce approximately unity negative feedback from the cathode of the output tube 70 to the grid-cathode circuit of the input tube 16 for slowly varying changes in the level of the output excursion extremities, the changes having a period which is long compared with the discharge time constant of the resistance-capacitance circuit 82, 84. The direct-current level of the repetitive excursion extremities at the output of the direct-coupled amplifier is, therefore, extremely constant.

The feedback circuit is effective regardless of whether the variation in potential of the excursion extremities at the circuit output is caused by drift in the amplifier or is caused by shifts in the direct-current level at the input to the amplifier.

It is necessary that the discharge time constant of the peak detector resistance-capacitance circuit 82, 84 be large compared with the time intervals between the successive signal excursion extremities so that once steady-state operation is attained the diode 80 can conduct only during each excursion extremity. The charging time constant of the peak detector circuit should be less than, or of the same order of magnitude as, the duration of the signal excursion extremities.

The principle of the invention can be utilized in any amplifier using one or more direct-coupled amplifying tubes or other kinds of amplifying transducers where a pulse is available which occurs at a more or less regular rate and which corresponds to an excursion extremity of the waveform. The peak detector circuit may receive its signals from the output of a voltage amplifying tube or transducer, as well as from the output of a cathode follower tube as has been described, and it is within the scope of the invention to amplify or attenuate the drift-stabilizing feedback signal obtained from the peak detector circuit in any way known to the art with or without phase inversion as required to obtain negative feedback. The limiting gain in the feedback loop is determined by the point at which sustained oscillations occur, as in all feedback systems.

The principle of this invention should not be confused with the method of providing automatic gain control for television transmitters by maintaining the synchronizing impulses at a constant amplitude. The circuit for this purpose is a peak detector circuit followed by amplification to give a voltage sufficient to control variable gain intermediate or radio-frequency amplifier stages.

This arrangement does not utilize the direct-coupled amplifier of the described invention nor does it function in a similar manner. In the embodiments of the invention described above, the gain of the amplifying stages is not varied by the feedback; only the direct-current component of the signal is regulated. Thus, a direct-coupled amplifier of extremely stable direct-current output level characteristics is provided by the invention, enabling the excellent phase and amplitude characteristics of this kind of amplifier to be utilized in applications in which the direct-coupled amplifier has heretofore been impractical.

While there have been shown and described and pointed out the fundamental novel features of the invention as applied to preferred embodiments thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. A stabilized direct-coupled amplifier for a signal which has repetitive excursion extremities comprising amplifier means having an input terminal for said signal and an output terminal for the amplified signal, said amplifier means including one or more amplifying transducers arranged in directly coupled and cascaded relationship to each other and to said input and output terminals respectively and said amplifier means having a gain for signals substantially independent of average operating potentials within normal operating range, potential storage means, means directly responsive to the amplified signal at said output terminal for controlling the potential stored in said potential storage means according to the excursion extremities of said amplified signal, and means for applying the potential of said potential storage means to said input terminal to oppose changes in the potential of the amplified repetitive signal excursion extremities.

2. A stabilized direct-coupled amplifier for a signal which has repetitive excursion extremities comprising amplifier means having an input terminal for said signal and an output terminal for the amplified signal, said amplifier means including one or more amplifying transducers arranged in directly coupled and cascaded relationship to each other and to said input and output terminals respectively and said amplifier means having a gain for signals substantially independent of average operating potentials within normal operating range, a peak detector circuit connected to the output of said amplifier means, said peak detector circuit having a potential storage circuit in which the stored potential is varied in accordance with changes in the excursion extremities of said amplified signal, and means for applying the potential of said potential storage means to the first of said amplifying transducers to oppose changes at said output terminal in the potential of the repetitive signal excursion extremities.

3. A stabilized direct-coupled amplifier for a signal which has repetitive excursion extremities comprising amplifier means having an input terminal for said signal and an output terminal for the amplified signal, said amplifier means including one or more amplifying transducers arranged in directly coupled and cascaded relationship to each other and to said input and output terminals respectively and said amplifier means having a gain for signals substantially independent of average operating potentials within normal operating range, a peak detector circuit connected to the output of said amplifier means, said peak detector circuit having a potential storage circuit in which the stored potential is varied in accordance with changes in the excursion extremities of said amplifier signal, and means for varying the bias of the grid-cathode circuit of the first of said amplifying transducers in accordance with the potential stored in said potential storage circuit to oppose changes in the potential of the amplified repetitive signal excursion extremities.

4. A stabilized direct-coupled amplifier for a signal which has repetitive excursion extremities comprising amplifier means having an input terminal for said signal and an output terminal for the amplified signal, said amplifier means including one or more amplifying transducers arranged in directly coupled and cascaded relationship to each other and to said input and output terminals respectively and said amplifier means having a gain for signals substantially independent of average operating potentials within normal operating range, a resistance-capacitance circuit having a discharge time constant which is large with respect to the time intervals between successive signal excursion extremities, rectifying means connected between the output of the amplifier means and said resistance-capacitance circuit for varying the potential across said resistance-capacitance circuit in accordance with changes in the potential of the repetitive excursion extremities of said amplified signal, and means connected to the resistance-capacitance circuit for varying the grid to cathode bias of the first of said amplifying transducers to oppose said changes in the potential of the amplified repetitive signal excursion extremities.

References Cited in the file of this patent

UNITED STATES PATENTS

| | | |
|---|---|---|
| 2,307,308 | Sorensen | Jan. 5, 1943 |
| 2,547,213 | Johnson et al. | Apr. 3, 1951 |
| 2,578,341 | Doba | Dec. 11, 1951 |